United States Patent [19]

Moss, III et al.

[11] Patent Number: 5,061,763

[45] Date of Patent: * Oct. 29, 1991

[54] STAIN RESISTANT TREATMENT FOR POLYAMIDE FIBERS

[75] Inventors: Thomas H. Moss, III; Ralph R. Sargent; Michael S. Williams, all of Rome, Ga.

[73] Assignee: Peach State Labs, Inc., Rome, Ga.

[ * ] Notice: The portion of the term of this patent subsequent to Jul. 10, 2007 has been disclaimed.

[21] Appl. No.: 457,348

[22] Filed: Dec. 27, 1989

Related U.S. Application Data

[63] Continuation-in-part of Ser. No. 341,774, Apr. 20, 1989, Pat. No. 4,940,757.

[51] Int. Cl.$^5$ .................. C08F 283/06; C08F 283/90; C08G 8/30; D06M 00/00
[52] U.S. Cl. ................................ 525/502; 525/401; 525/402; 524/156; 8/115.54; 8/115.56
[58] Field of Search ............. 8/115.6, 115.54, 115.56; 252/8.6; 427/385.5, 393.4; 525/592, 401, 402; 524/156; 428/267

[56] References Cited

U.S. PATENT DOCUMENTS

| | | | |
|---|---|---|---|
| 1,901,536 | 3/1933 | Schafer | 528/150 |
| 1,972,754 | 9/1934 | Biedermann | 528/171 |
| 1,988,985 | 1/1935 | Schafer | 528/150 |
| 2,036,161 | 3/1936 | Schuette et al. | 528/150 |
| 2,112,361 | 3/1938 | Fischer | 528/150 |
| 2,171,806 | 9/1939 | Russell et al. | 528/150 |
| 2,581,390 | 1/1952 | De Groote et al. | 525/502 |
| 3,221,079 | 11/1965 | Harris | 525/58 |
| 3,481,890 | 12/1969 | Guldenpfenning | 525/30 |
| 3,691,118 | 9/1972 | Fishman | 524/313 |
| 3,843,576 | 10/1974 | Parkinson | 524/510 |
| 3,851,012 | 11/1974 | Wertz et al. | 525/135 |
| 4,187,383 | 2/1980 | Cowherd et al. | 560/224 |
| 4,501,591 | 2/1985 | Ucci et al. | 8/495 |
| 4,565,838 | 1/1986 | Paar et al. | 523/414 |
| 4,592,940 | 6/1986 | Blyth et al. | 428/96 |
| 4,680,212 | 7/1987 | Blyth et al. | 428/97 |
| 4,690,995 | 9/1987 | Keskey et al. | 526/286 |
| 4,739,002 | 4/1988 | Ishikawa et al. | 524/270 |
| 4,780,099 | 10/1988 | Greschler et al. | 8/115.6 |
| 4,822,373 | 4/1989 | Olson et al. | 8/115.6 |
| 4,839,212 | 6/1989 | Blyth et al. | 428/96 |
| 4,940,757 | 7/1990 | Moss et al. | 525/502 |

FOREIGN PATENT DOCUMENTS

| | | |
|---|---|---|
| 0235980 | 9/1987 | European Pat. Off. . |
| 0235989 | 9/1987 | European Pat. Off. . |
| 0267681 | 5/1988 | European Pat. Off. . |
| 0268374 | 5/1988 | European Pat. Off. . |
| 0329899 | 8/1989 | European Pat. Off. . |
| 0332342 | 9/1989 | European Pat. Off. . |

OTHER PUBLICATIONS

IG-Technical Research, Inc., *Chem. Abstr.* 102:204892b (1985).
Jose, D. J., et al., *Canadian Textile Journal,* 105 (11) 34–36 (Nov., 1988).
Kosicek et al., *Chem. Abstr.* 99:19633Ou (1983).
Kujas, E. F., *Chem. Abstr.* 107:79373h (1987).
Liss, T. A., *Chem. Abstr.,* 108:39601v (1988).
Matsuo, A., et al., 104:336778a (1986).
Matsushita Electric Works, Ltd., *Chem. Abstr.* 95:82167h (1981).
Minnesota Mining & Manufacturing Co., et al., *World Textiles Abstracts* 5292 (1988).
Venkataboopathy, L., et al., *Chem. Abstr.* 99:124391s (1983).
Shima, T., et al., *Chem. Abstr.* 1467070c (1974).
Chatterjee, S., *Chem. Abstr.* 106:214512z (1987).
Greschler, I., et al., *Chem. Abstr.* 108:7466p (1988).
Hanawa, T., *Chem. Abstr.* 108:76525u (1988).
Anton, A., *Text. Chem. Color* 13, 45–50 (Feb. 1981).
Bolyachevskaya, K. I. et al., *Chem. Abstr.* 107:7734d (1987).
Carr, *Textile Horizons,* 43–44 (1988).

*Primary Examiner*—John C. Bleutge
*Assistant Examiner*—W. R. H. Clark
*Attorney, Agent, or Firm*—Kilpatrick & Cody

[57] ABSTRACT

A stain resistant composition for fibers having polyamide linkages prepared by polymerizing an α-substituted acrylic acid or ester in the presence of a sulfonated aromatic formaldehyde condensation plymer, or by polymerization of a sulfonated hydroxyaromatic ester of an α-substituted acrylic acid or acrylic acid, and methods for making and applying the composition.

32 Claims, 3 Drawing Sheets

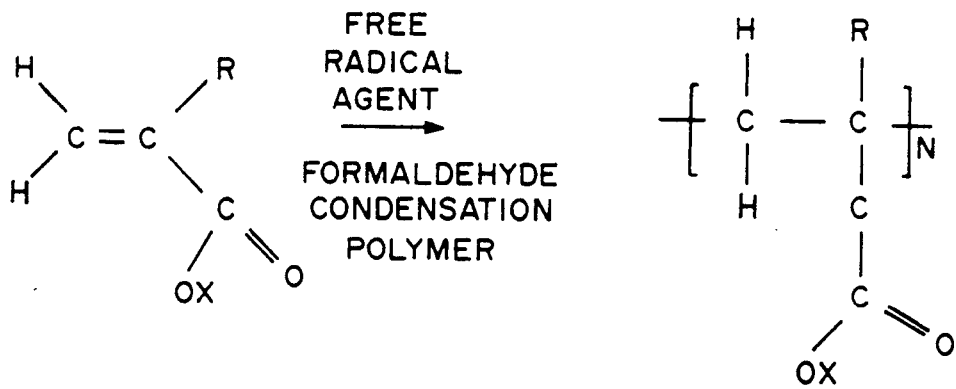

R = AN ALIPHATIC OR AROMATIC HYDROCARBON, HALOGENATED HYDROCARBON, OR SULFONATED HYDROCARBON FROM $C_1$ TO $C_{20}$, PHENOL, NAPTHOL, SULFONATED PHENOL, SULFONATED NAPTHOL, OR A HALOGEN;

X = H OR A HYDROXYLATED, ETHOXYLATED, SULFONATED, OR HALOGENATED HYDROCARBON OF $C_1$ TO $C_{20}$; AND

WHEREIN THE FORMALDEHYDE CONDENSATION POLYMER IS CHEMICALLY BOUND TO THE POLYACRYLIC ACID.

FIGURE 1

STAIN RESISTANT TREATMENT FOR POLYAMIDE FIBERS

This application is a continuation-in-part of U.S. Ser. No. 07/341,774, filed Apr. 20, 1989, issued as Thomas Hudson Moss, III, Ralph Richard Sargent and Michael S. Williams U.S. Pat. No. 4,940,757, entitled "Stain Resistant Polymeric Composition".

BACKGROUND OF THE INVENTION

This invention relates to stain resistant polymeric compositions for the treatment of natural and synthetic fibers containing polyamide linkages.

Nylon has had a dramatic effect on both industry and society since its discovery by W. H. Carothers more than fifty years ago. It is estimated that 75% of all carpet currently produced in the United States, and 46% of all carpet produced in Europe, is prepared from nylon fiber.

Nylon fiber is relatively inexpensive and offers a combination of desirable qualities such as comfort, warmth, and ease of manufacture into a broad range of colors, patterns and textures. However, nylon, as well as other polyamide fibers and fabrics, is easily stained by certain natural and artificial colorants such as those found in coffee, mustard, wine, and soft drinks.

Recently, fluorochemical coatings have been developed that prevent wetting of the carpet surface, by minimizing chemical contact between the carpet surface and substances that can stain the carpet, making the substance easier to remove. Fluorochemicals also provide a physical barrier to staining material. Typical fluorochemicals contain a perfluoroalkyl radical having 3–20 carbons, and are produced by condensation of a fluorinated alcohol or fluorinated primary amine with a suitable anhydride or isocyanate, for example, N-ethyl perfluorooctyl-sulfonamidoethanol and toluene diisocyanate reacted in a 2:1 molar ratio.

Examples of commercially available fluorochemical coatings include Scotchgard TM 358 and 352 (Minnesota Mining & Mfg. Co.) and Zepel TM and Teflon TM (E. I. Du Pont Nemours & Co.). Antron Plus TM carpet manufactured by Du Pont contains nylon carpet fibers coated with fluorocarbons.

While fluorochemical coatings are effective in protecting carpet from substances such as soil, they offer little protection from stains resulting from acid dyes that are found in common household materials such as wine, mustard and soft drinks. Acid dyes are bases that bond to protonated amino sites in the polyamide fiber. A wide variety of methods have been developed to make fibers containing polyamide linkages more resistant to staining by acid dyes. The most widely used method involves the application to the polyamide fiber of a colorless formaldehyde phenol or naphthol condensation polymer that has sulfonate groups on the aromatic rings. The sulfonate groups ionically bond to available protonated amino groups in the polyamide fiber, preventing the protonated amino groups from later bonding to common household acid dyes. The polymeric coating also protects the carpet fiber by creating a barrier of negative electric charge at the surface of the fiber that prevents like-charged acid dyes from penetrating the fiber.

Examples of phenol-formaldehyde condensation polymers are described in Ucci, et al. U.S. Pat. No. 4,501,591, and Blythe, et al. U.S. Pat. No(s). 4,592,940 and 4,680,212. In particular, U.S. Pat. No(s). 4,592,940 and 4,680,212 describe a formaldehyde condensation product formed from a mixture of sulfonated dihydroxydiphenylsulfone and phenylsulphonic acid, wherein at least 40% of the repeating units contain an $-SO_3X$ radical, and at least 40% of the repeating units are dihydroxydiphenylsulfone.

Sulfonated hydroxyaromatic formaldehyde condensation products marketed as stain resistant agents include Erional TM NW (Ciba-Geigy Limited), Intratex N (Crompton & Knowles Corp.), Mesitol TM NBS (Mobay Corporation), FX-369 (Minnesota Mining & Mfg. Co.), CB-130 (Grifftex Corp.), and Nylofixan P (Sandoz Chemical Corp.) Antron Stainmaster TM carpet manufactured by Du Pont contains nylon fibers that have both a fluorocarbon coating and a sulfonated phenol-formaldehyde condensation polymeric coating.

While sulfonated hydroxyaromatic formaldehyde condensation polymeric coatings reduce the staining of polyamide fibers by acid dyes, they do not impart resistance to staining by compounds such as mustard with tumeric or hot coffee. Further, although the polymeric coating is colorless when applied, the resins react with ultraviolet light or nitrogen dioxide over time, gradually turning yellow. The yellowing can be severe enough to prevent the use of the stain resistant compositions on light shaded textile articles.

Efforts to overcome the discoloration problem are discussed in Greschler, et al., U.S. Pat. No. 4,780,099 describing the reduction of yellowing by application of phenol formaldehyde condensation stain resistant compositions at pH values of 1.5–2.5, and in European Pat. No. Application 87301180.3 by E. I. Du Pont Nemours & Co., describing that polyamide fabrics treated with etherified or acylated formaldehyde phenol condensation polymers containing 10–25% $SO_3$ groups and 75–90% $SO_3$ groups that have improved resistance to staining as well as discoloration.

While the performance of stain resistant compositions have been improved, none of the stain resistant compositions currently available offer a suitable combination of protection from staining by common household products such as mustard, coffee, and soft drinks, that also do not discolor over time.

It is therefore an object of the present invention to provide a stain resistant composition that protects polyamide carpets, upholstery, and other synthetic and natural fibers from staining.

It is a further object of the present invention to provide a stain resistant composition that does not yellow significantly over time.

It is still another object of the present invention to provide methods for coating natural and synthetic fibers that are effective, versatile, economical and result in products that are resistant to staining by many common household compounds, including coffee, mustard, wine and soft drinks.

It is a still further object of the present invention to provide natural and synthetic fibers coated with these stain resistant compositions that do not discolor significantly over time.

It is yet another object of the present invention to provide a method for preparing a stain resistant composition.

SUMMARY OF THE INVENTION

A stain resistant composition is prepared by polymerizing an α-substituted acrylic acid in the presence of a sulfonated aromatic formaldehyde condensation polymer to form a polymer of the two reaction components. In a variation of this embodiment, an α-substituted acrylic acid is copolymerized with a fluorinated or perfluorinated acrylic acid derivative in the presence of the sulfonated aromatic formaldehyde condensation polymer to yield a polymer of the three reaction components.

In another embodiment, a stain resistant composition is prepared by (1) esterification of an acrylic acid with a sulfonated hydroxyaromatic compound followed by (2) polymerization of the acrylic acid. The sulfonated hydroxyaromatic compound is polymerized by either formaldehyde condensation or through a free radical process. After polymerization by either type of reaction, crosslinking can be effected using the other type of polymerization reaction. For example, a sulfonated hydroxyaromatic α-substituted acrylate can be polymerized in a free radical reaction and then crosslinked in a formaldehyde condensation reaction.

The polymeric compositions can be used alone or blended with a second polymeric composition to provide additional protection to polyamide fibers from acid dyes, such as those in soft drinks (for example, Food, Dye, and Color Number 40), mustard with tumeric, and wine, and colorants, such as those found in coffee. The compositions are resistant to discoloration over time. Polyamide textiles coated with the composition do not discolor when exposed to 20 hours of continuous xenon light.

The compositions can be effectively applied to any synthetic or natural fiber having polyamide linkages using a wide variety of means, for example, in a batch or continuous exhaust system, a treat and dry system, or in a tumbler with the polyamide material prior to extrusion. The composition can also be effectively applied as a foam, in a nonionic or anionic detergent, or along with antistatic agents, other water soluble polymers, or in combination with any other stain resistant hydroxyaromatic condensation product.

Metal salts can be added to the stain resistant composition to improve exhaustability or increase shampoo stability.

BRIEF DESCRIPTION OF THE FIGURES

FIG. 1 is an illustration of the reaction scheme of polymerization of an α-substituted acrylic acid in the presence of a sulfonated aromatic formaldehyde condensation polymer.

DETAILED DESCRIPTION OF THE INVENTION

The present invention is a group of polymeric compositions that impart superior stain resistance to fibers having polyamide linkages. In one embodiment, the compositions are prepared by polymerizing one or more α-substituted acrylic acid in the presence of a sulfonated aromatic formaldehyde condensation polymer to form a polymer of all of the reaction components, as shown schematically in FIG. 1. As an example, an α-substituted acrylic acid can be homopolymerized or can be copolymerized with a fluorinated or perfluorinated acrylic acid or acrylate in the presence of the condensation polymer.

Figure 2:
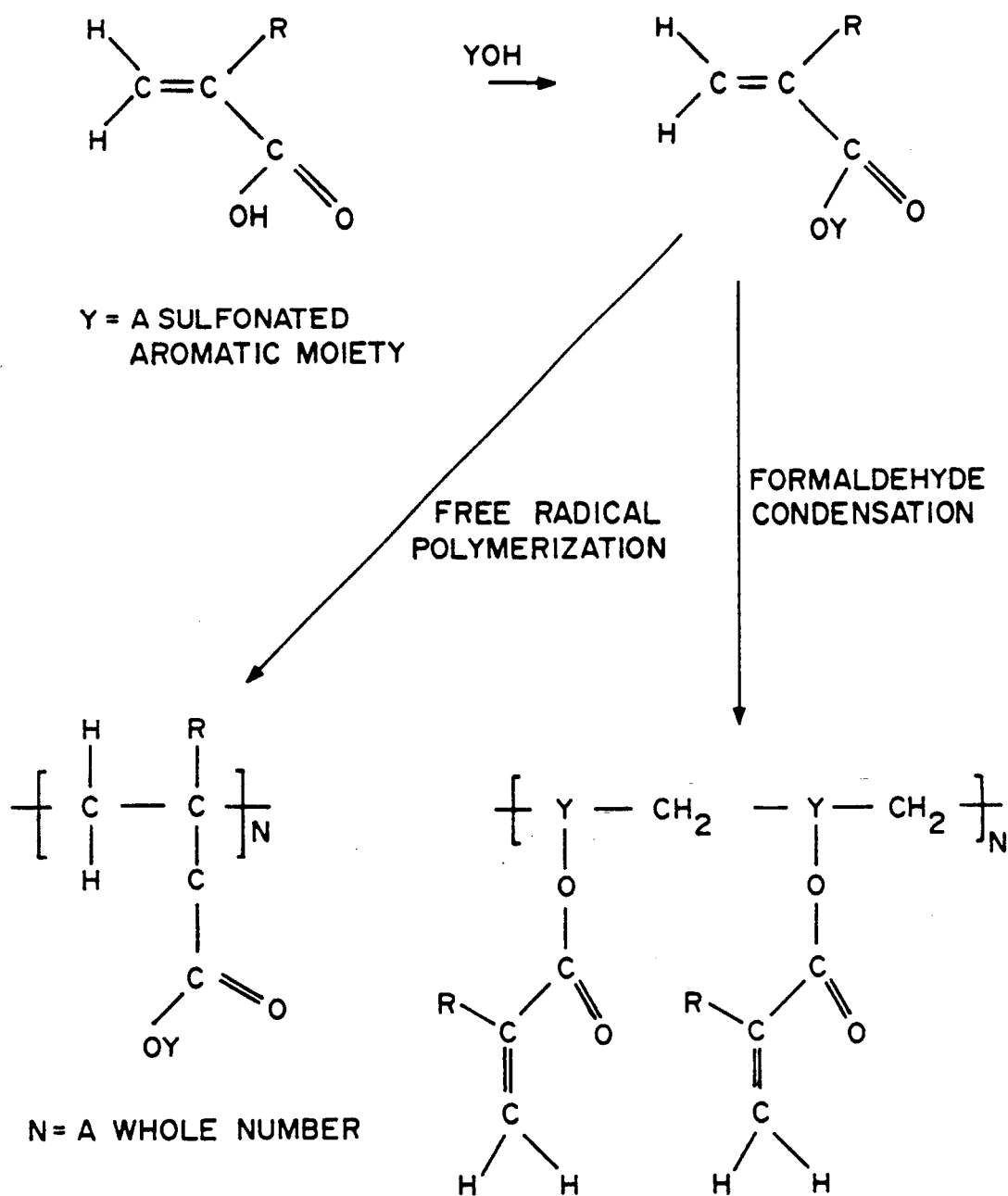
FIG. 2 is an illustration of the reaction scheme of the esterification of an acrylic acid with a sulfonated hydroxyaromatic compound followed by either free radical or formaldehyde condensation polymerization.

In another embodiment, a stain resistant composition is prepared by (1) esterification of an acrylic acid with a sulfonated hydroxyaromatic compound followed by (2) polymerization of the acrylic acid. Polymerization can be accomplished with a free radical initiator (forming a polyacrylic acid) or by formaldehyde condensation (forming a condensation polymer), as shown schematically in FIG. 2. Crosslinking can be effected after either type of polymerization reaction using the other type of polymerization reaction. For example, a sulfonated aromatic α-substituted acrylate can be polymerized in a free radical reaction and then crosslinked in a formaldehyde condensation reaction.

These compositions represent a significant advance in stain resisting technology since they do not discolor significantly over an extended period of time, and they provide superior protection from acid dyes.

The compositions can be applied to any fiber containing polyamide linkages. Polyamide linkages are found in a wide variety of fibers and fabrics, such as wool, silk, natural leather, synthetic leather and nylon. Wool is composed primarily of α-keratin, a naturally occurring α-helical fibrous protein. Silk is composed primarily of β-keratin, a naturally occurring fibrous protein existing in a zig-zag structure. Leather is almost pure collagen, a fibrous protein composed primarily of glycine, alanine, proline and 4-hydroxyproline, forming a three stranded helical structure. Nylon is a synthetic polyamide prepared by the polycondensation of a dicarboxylic acid and a diamine, such as adipic acid and hexamethylene diamine (nylon 6,6). Nylon can also be produced from a cyclic amide such as caprolactam (nylon 6).

As characterized below, the methods for making these compositions are applicable to a wide variety of starting materials and final products.

PREPARATION OF THE STAIN RESISTANT POLYMERIC COMPOSITION

I. Polymerization of α-Substituted Acrylic Acid in the Presence of a Sulfonated Aromatic Formaldehyde Condensation Polymer In one embodiment, the stain resistant polymeric composition is prepared by polymerizing an α-substituted acrylic acid in the presence of a sulfonated aromatic formaldehyde condensation polymer to yield a polymer of the two reaction components. Both the carboxylic acid groups on the poly(α-acrylic acid) and the sulfonate groups on the aromatic formaldehyde condensation polymer contribute to the stain resisting properties of the composition by reducing the availability of the protonated amino groups on the polyamide fiber.

A. Sulfonated Aromatic Formaldehyde Condensation Polymers

The sulfonated aromatic formaldehyde condensation polymer can be synthesized as described below or purchased from commercial sources.

Any sulfonated aromatic compound that will undergo formaldehyde condensation can be used in the preparation of the stain resistant composition. Examples are the condensation polymers of 4,4'-dihydroxydiphenylsulfone (also referred to as 4,4'-sulfonylbisphenol or DDS), phenyl 4-sulfonic acid, and naphthalene sulfonic acid and 2,4-dimethylbenzene sulfonic acid. Other suitable aromatic compounds include sulfonated derivatives of naphthol and vinyl aromatics, such as styrene and styrene derivatives. The sulfonated aromatic compound can be hydroxylated to impart increased water solubility and to allow for increased hydrogen bonding of the condensation polymer with the polyamide fiber.

Stain resistant compositions containing sulfonated naphthalene units have good wear durability, and impart softness to the treated fiber.

To achieve good stain resisting activity, the condensation polymer should contain a significant number of sulfonate groups. It is preferred that at least one sulfonate group be attached to between 30% and 70% of the monomeric units of the condensation polymer. A preferred polymeric composition is completely water soluble.

The sulfonated aromatic formaldehyde resins can be prepared by methods known to those skilled in the art. Methods of preparation of condensation polymers of sulfonated aromatic compounds with formaldehyde are provided in Schafer U.S. Pat. No. 1,901,536, Biedermann U.S. Pat. No. 1,972,754, Schafer U.S. Pat. No. 1,988,985, Fischer U.S. Pat. No. 2,112,361 Russell, et al. U.S. Pat. No. 2,171,806 and Blythe, et al U.S. Pat. No. 4,680,212, all incorporated herein by reference.

In general, an aromatic compound such as phenol, naphthalene, or naphthol is first sulfonated. Phenol is sulfonated in the ortho and para positions, with the 4-sulfonic isomer predominating. 1-Naphthol is sulfonated predominately in the 4 position. 2-Naphthol is sulfonated primarily in the 2 position. 4,4'-Dihydroxydiphenylsulfone (DDS) is sulfonated primarily in the 3' position. If it is desirable to direct sulfonation to one ring of DDS, one of the hydroxyl groups can be protected, with a suitable protecting group such as acetyl, before the sulfonation step is carried out. The protecting group can be removed before or after polymerization. It is preferable to remove the hydroxyl protecting group before polymerization and after sulfonation. Acetyl groups can be removed by vacuum stripping before polymerization.

The sulfonated aromatic compound is then polymerized with formaldehyde under either acidic or basic conditions. Mixtures of sulfonated aromatic compounds can also be polymerized. Typically, under acidic conditions, a mole of sulfonated aromatic compound is reacted with 0.3 to 0.5 mole of formaldehyde. Under basic conditions, a mole of sulfonated aromatic compound is reacted with 0.9 to 1.5 mole of formaldehyde. When the polymerization is performed in base, the product has more —$CH_2OH$ terminal groups than when prepared in acid, rendering the polymer more water soluble. It is possible to get crosslinking of the growing polymer chains during the polymerization. The extent of crosslinking is limited by steric factors and by adjustment of the curing conditions. Crosslinked phenolic-aldehyde polymers are sometimes referred to as "novolacs ".

The sulfonated aromatic condensation polymer can be reacted with a base to form a sulfonic acid salt. Currently marketed stain resistant condensation polymers are typically sold as the sodium sulfonate salt. The condensation polymer can also be used in the form of an ammonium, alkali metal, potassium or other salt, or as the free sulfonic acid.

Sulfonated hydroxyaromatic resins can be purchased commercially, such as CB-130 (Grifftex Corp.; a formaldehyde condensation product of 4,4'-dihydroxydiphenylsulfone), Erional TM NW (Ciba-Geigy Limited; naphthalene sulfonic acid, polymer with formaldehyde and 4,4'-sulfonylbis(phenol)), FX-369 (Minnesota Mining & Mfg. Co.; condensation polymer of 4,4'-dihydroxydiphenylsulfone), Gascofix TM NY (Gaston County Dyeing Machine Company), Tamol TM SN (Rohm & Haas Co.), Mesitol TM NBS (Mobay Corporation), Nylofixan TM P (Sandoz Corp.), and Intratex TM N (Crompton & Knowles Corp.). The sulfonated aromatic resins are typically bought as a 30–40% solids aqueous solution, that can contain glycols.

B. α-Substituted Acrylic Acids

In one embodiment, an α-substituted acrylic acid $H_2C=C(R)CO_2X$, wherein R is an aliphatic or aromatic hydrocarbon, halogenated hydrocarbon, or sulfonated hydrocarbon of from $C_1$ to $C_{20}$, phenol, naphthol, sulfonated phenol, sulfonated naphthol or a halogen, and X is H or a hydroxylated, ethoxylated, sulfonated or halogenated aliphatic or aromatic hydrocarbon of $C_1$ to $C_{20}$, is polymerized in a solution containing the sulfonated aromatic resin, to yield the stain resistant composition. Preferred R groups are methyl, ethyl, propyl, butyl, phenyl phenol, sulfonated phenol, naphthol, chloro, and fluoro.

Mixtures of the α-substituted acrylic acids can also be reacted together Esters of α-substituted acrylic acids can be polymerized in combination with unesterified α-substituted acrylic acids. However, if the alcohol from which the ester is prepared is hydrophobic, as the percentage of ester in the composition increases, water solubility and affinity for the polyamide fiber will decrease. If the alcohol from which the ester is prepared is hydrophilic or basic, water solubility is not adversely affected. Acrylic acid derivatives with low water solubility can be polymerized using emulsion polymerization techniques known to those skilled in the art.

Examples of suitable α-substituted acrylic acids include α-alkyl acrylic acids, such as α-methacrylic acid, α-ethylacrylic acid, and α-propyl acrylic acid, and α-substituted acrylates, such as methyl methacrylate, and ethyl perfluoromethacrylates.

In variations of these compositions, various α-substituted acrylic acids are copolymerized in the presence of the sulfonated aromatic formaldehyde condensation product. In one example, an unhalogenated α-substituted acrylic acid is copolymerized with a semihalogenated or perhalogenated acrylic acid or acrylate. In another example, an α-substituted acrylic acid or anhydride is esterified with a halogenated alcohol, and then polymerized or copolymerized in the presence of the condensation polymer. Preferred monomers are the fluorinated $C_8$–$C_{12}$ esters of α-methacrylic acid. It is preferable to copolymerize a fluorinated acrylate with at least some free methacrylic acid to give the fiber enhanced durability.

In another embodiment, the acrylic acid is esterified after polymerization, by methods known to those skilled in the art.

Fluorinated alkyl esters of acrylic acid have low water solubility. When polymerizing these esters, an emulsifying agent such as a nonyl phenol, an ethoxylated oleic acid ester, or a sorbitan monooleate should be used.

C. Polymeritic

As illustrated in FIG. 1, $H_2C=C(R)(CO_2X)$, wherein R is a hydrocarbon, halogenated, hydrocarbon, or sulfonated hydrocarbon of from $C_1$ to $C_{20}$, phenol, naphthol, sulfonated phenol, sulfonated naphthol or a halogen, and X is H or a hydroxylated, ethoxylated, sulfonated, or halogenated hydrocarbon of $C_1$ to $C_{20}$, and wherein R and X can vary in the reaction mixture, is mixed with the sulfonated aromatic resin solution in a ratio ranging from 30:1 to 1:1 of α-substituted acrylic acid to condensation polymer solids. A preferred range of reactants is from a maximum of seven parts α-substituted acrylic acid to one part condensation polymer. An optimal range is between 6:1 and 2:1 of α-substituted acrylic acid to condensation polymer resin.

A free radical chain initiator such as potassium persulfate, ammonium persulfate, or sodium persulfate is added to initiate polymerization. The reaction is heated to between approximately 50° C.–100° C., typically 60° C., with stirring for a time sufficient to effect initiation of polymerization (typically 30 minutes to one hour). The initiation of polymerization is sufficiently exothermic to raise the temperature of solution to 100° C. The heat of reaction is controlled by reflux. The reaction temperature is allowed to stabilize, and then maintained at 100° C. for at least 1 hour. Preferably, polymerization is allowed to proceed until one percent or less monomer is left in the reaction solution.

Once the reaction is complete the reacted material is diluted with water to the desired solids concentration and viscosity. The resulting polymeric solution is acidic. If desired, the pH of the solution can be adjusted with a base such as ammonium, sodium, or potassium hydroxide.

The reaction can be performed in one batch or by dose feed. In a dose feed process, the reaction is started by adding a percentage of the starting material to the reactor, and heating to initiate reaction. After the reaction creates an exotherm, additional reactants are added. The dose feed process can be used to control the vigorous nature of the reaction. As an example, ⅓ to ½ of the starting materials is added to the reactor. After the solution boils, Δ of the remaining material is added. The final ⅔ of the remaining material is added in two aliquots at 20 minute intervals.

The resulting polymeric composition has enhanced stain resisting properties as compared to a sulfonated aromatic condensation polymer alone. The stain resisting properties are dependent in part on the solids content of the polymerization solution. The higher the solids content of solution in the acrylic acid polymerization reaction, the better the stain resisting properties of the resulting polymer.

A polymerization solution of α-substituted acrylic acid and condensation polymer resin containing over 15% solids typically has a viscosity approaching a gel-like consistency. A viscosity reducing agent can be added to reaction mixtures prior to polymerization to avoid gel formation, as illustrated in Example 2 below. Examples of viscosity reducing agents are the sodium, potassium, and ammonium salts of xylene sulfonate, cumene sulfonate, toluene sulfonate, and dodecyldiphenyl disulfonate.

In general, the amount of initiator needed for polymerization increases as the percent of monomer in the reaction solution increases. However, in a concentrated reaction solution, the need to use a substantial amount of initiator must be balanced against the tendency of high quantities of initiator to actually decrease molecular weight and viscosity. Typically, the weight of the initiator used is approximately 23% that of the weight of the monomer, but the optimal amount can be determined in a given reaction without undue experimentation.

It has also been discovered that the viscosity of the polymerization reaction can be reduced by adding to the reaction mixture a small amount of a chain length terminator such as toluene sulfonic acid or xylene sulfonic acid. Addition of the chain length terminator lowers the molecular weight of the resulting polymer. Polymers of low molecular weight tend to penetrate the shank of the polyamide fiber more easily than high molecular weight polymers.

In the Examples below, the term "active solids" refers to the combined amount of methacrylic acid, formaldehyde condensation polymer, and initiator. The term "total solids" refers to the amount of acrylic acid, formaldehyde condensation polymer, initiator, and viscosity adjusting agent.

EXAMPLE 1

Preparation of Composition containing the Reaction Produce of Methacrylic Acid and the Formaldehyde Condensation Polymer of Sodium Naphthalene Sulfonate and 4,4'-Diroxydiphenylsulfone Glacial methacrylic acid (99% in water; 302.0 grams; approximately 3.50 moles), water (1744.0 grams), formaldehyde condensation copolymer of sodium naphthalene sulfonate and 4,4'-dihydroxydiphenylsulfone (Erional NW-LQ; 117.0 grams of a solution of approximately 37% solids) and potassium persulfate (1.94 grams) were mixed in a 5 liter round bottom flask equipped with a mechanical stirrer and hot bath. The resulting brownish solution was heated to approximately 50° C.–60° C. with stirring, during which time the color changed to yellow. After approximately 45 to 60 minutes, the polymer began to gel, forming a cloudy suspension. The suspension spontaneously began to boil, indicating a large exothermic reaction. The hot bath was removed and stirring continued in a room temperature bath until the solution temperature reached 50° C. To the resulting polymeric solution was added 540.0 grams of a 40% solution of sodium xylene sulfonate. The resulting clear yellowish solution contained approximately 13.5% total solids. The pH of a 10% solution of the reaction product was 2.9.

EXAMPLE 2

Preparation of Composition containing the Reaction Product of Methacrylic Acid and the Formaldehyde Condensation Polymer of Sodium Naphthalene Sulfonate and 4,4'-Diroxydiphenylsulfone Glacial methacrylic acid (99% in water, 22.3 grams), water (48.7 grams), formaldehyde condensation polymer of sodium naphthalene sulfonate and 4,4'-dihydroxydiphenylsulfone (Erional NW-LQ; 37–40% solution; 12.3 grams), potassium persulfate (5.7 grams), and sodium xylene sulfonate (40% solution; 11.0 grams) were placed in a 2 liter round bottom flask equipped with a mechanical stirrer, reflux condenser, thermometer, and water bath. The brownish solution was heated to 65° C. with stirring. A large exothermic reaction rapidly raised the temperature of the reaction mixture to 100° C. The temperature was maintained at 90° C. –100° C. for 30 minutes. The resulting viscous, yellow/red solution was diluted with 70.0 grams of water to give a final total solids concentration of 20.7 weight percent.

EXAMPLE 3

Preparation of Composition containing the Reaction Product of Methacrylic Acid and the Ammonium and or Sodium Formaldehyde Condensation Copolymer of 2,4-Dimethyl-Benzenesulfonic Acid and 4,4'-Sulfonylbis(phenol)

The reaction procedure of Example 2 was followed, with a ratio by weight of 20.0% glacial methacrylic acid, 17.0% of an approximately 29% solution of ammonium and, or, sodium formaldehyde condensation copolymer of 2,4-dimethyl-benzenesulfonic acid and 4,4'-sulfonylbis(phenol), 3.5% ammonium persulfate, 35.0% sodium xylene sulfonate, and 24.5% water. The final product had an active solids content of 28.5%.

EXAMPLE 4

Preparation of Composition containing the Reaction Product of Methacrylic Acid and the Ammonium and or Sodium Formaldehyde Condensation Copolymer of 2,4-Dimethyl-Benzenesulfonic Acid and 4,4'-Sulfonylbis(phenol)

The reaction procedure of Example 2 was followed, with a ratio by weight of 20.0% glacial methacrylic acid, 22.0% of an approximately 29% solution of ammonium and, or, sodium formaldehyde condensation copolymer of 2,4-dimethylbenzenesulfonic acid and 4,4'-sulfonylbis(phenol), 4.0% ammonium persulfate, 35.0% sodium xylene sulfonate, and 19.0% water. The final product had an active solids content of 30.5%.

EXAMPLE 5

Dilution of Composition containing the Reaction Product of Methacrylic Acid and the Ammonium and or Sodium Formaldehyde Condensation Copolymer of 2,4-Dimethyl-Benzenesulfonic Acid and 4,4'-Sulfonylbis(phenol)

The products of Examples 3 and 4 were diluted to an 22% active solids content with water to provide a less concentrated product. These formulations were used as is to treat nylon fibers.

EXAMPLE 6

Dilution of Composition containing the Reaction Product of Methacrylic Acid and the Formaldehyde Condensation Polymer of Sodium Naphthalene Sulfonate and 4,4'-Dihydroxydiphenylsulfone.

The reaction product of Example 2 was diluted with water to give a final total active solids concentration of 13.5 weight percent. The less concentrated product provides adequate stain protection at a lower cost to the manufacturer.

The exact chemical structure of the stain resistant polymeric composition prepared as described above is not known at this time. Since substantially more α-substituted acrylic acid than sulfonated aromatic condensation polymer is used to make the stain resistant composition, it is assumed that the composition is predominantly a poly(α-substituted acrylic acid) in association with a lesser amount of condensation polymer. It is also possible that during the free radical polymerization reaction, α-substituted acrylic acid monomers are reacting with functional groups on the condensation polymer, some of which may have been oxidized under the polymerization conditions.

II. Polymers of Sulfonate Hydroxyaromatic Esters of α-Substituted Acrylic Acids In another embodiment of the claimed invention, acrylic acids, including α-substituted acrylic acids ($H_2C=C(R)CO_2H$, wherein R is hydrogen, a hydrocarbon, halogenated hydrocarbon, or sulfonated hydrocarbon of from $C_1$ to $C_{20}$, phenol, naphthol, sulfonated phenol, sulfonated naphthol or a halogen), are esterified with sulfonated hydroxyaromatic compounds (X) to produce α-substituted acrylates that can be polymerized in the presence or absence of a formaldehyde condensation polymer ($H_2C=C(R)CO_2X$, wherein R is hydrogen, a hydrocarbon, halogenated hydrocarbon, or sulfonated hydrocarbon of from $C_1$ to $C_{20}$, phenol, naphthol, sulfonated phenol, sulfonated naphthol or a halogen). Any sulfonated hydroxyaromatic compound that forms an ester with an acrylic acid, and provides a sulfonate group available for bonding with a protonated amine in a polyamide fiber is suitable. The resulting polymer should be non-brittle and film forming with little water solubility when dried. A diester that includes two molecules of acrylic acid to one molecule of dihydroxy compound can be formed from the reaction of a dihydroxy aromatic compound with acrylic acids.

Examples of suitable hydroxyaromatic compounds include sulfonated dihydroxydiphenylsulfone, hydroxybenzenesulfonic acid, hydroxynaphthalenesulfonic acid, and derivatives thereof. Dihydroxydiphenylsulfone can be monoacetylated before sulfonation. In the preferred embodiment, the acetyl group is taken off before esterification.

The method of preparation of these esters are conventional and known to those of skill in the art, or can be determined without significant experimentation. For example, excess acrylic acid anhydride can be heated with the desired alcohol neat or in an organic solvent. The esterified acrylic acid can be used as is without isolation in the polymerization reaction.

Example 7 provides a working example of the method of preparation of the 4,4'-dihydroxydiphenylsulfone ester of α-methacrylic acid.

EXAMPLE 7

Preparation of the 4,4'-Dihydroxydiphenylsulfone Ester of α-Methacrylic Acid.

Excess α-methacrylic acid anhydride and dihydroxydiphenyl sulfone were heated neat (without solvent) at approximately 100° C. for 4 to 5 hours. The reaction was followed by thin layer chromatography. When the reaction was finished, the product was used as is in a free radical polymerization reaction.

The ester formed as described above can be polymerized in the presence or absence of a formaldehyde condensation polymer to form a polyacrylate. If desired, the polyacrylate can then be crosslinked in a formaldehyde condensation reaction. Alternatively, the ester can be first polymerized in a formaldehyde condensation reaction and then crosslinked by free radical polymerization.

III. Blends of Stain Resistant Polymeric Compositions with Other Polymers

Any of the stain resistant polymeric compositions described above can be blended with water or soil repelling polymers to increase their effectiveness. The blending polymer should be anionic in charge and have an affinity for the nylon. It should also be compatible with the stain resisting polymeric composition, and provide a protective film for the ionic bond formed between the protonated terminal amine groups on the polyamide and the sulfonate groups on the polymeric resin. This protective film strengthens, and prevents materials from disrupting, the polyamide/stain resistant composition salt complex.

Halogenated polymers are especially suitable as blending materials because they are superior soil and water repellers. Examples are perfluorinated urethanes and acrylates. Examples are polymers prepared from the 2,2,3,4,4,4-hexafluorobutyl and 2,2,3,3-tetrafluoropropyl esters of acrylic acid. These polymers can be mixed with halogenated monomers such as fluorinated alkyl esters, phosphates, ethers, and alcohols, to increase performance.

Two commercially available fluorochemicals that can be blended with the stain resistant composition are Zonyl ™ 5180 Fluorochemical dispersion, and Teflon Tuft Coat Anionic, both manufactured by E. I. Du Pont de Nemours and Company, Inc. Zonyl ™ 5180 is an aqueous fluorochemical dispersion containing a 1-10% polyfunctional perfluoroalkyl ester mixture, 10-20% polymethylmethacrylate, and 70-75% water. Teflon Tuft-coat Anionic contains 5-10% perfluoroalkyl substituted urethanes, 1-5% polyfunctional perfluoroalkyl esters, and 85-90% water.

pH is an important consideration when blending the water and soil repelling polymeric composition with the stain resisting polymeric composition. Both Zonyl ™ 5180 and Teflon Tuft-Coat are anionic mixtures. The stain resistant compositions prepared herein are acidic. Gradual acidification of the mixture occurs when the stain resistant polymer is added to the perfluorinated compound solution. Precipitates will form if there is a rapid decline in pH.

The commonly used viscosity reducing agent, sodium xylene sulfonate, is not compatible with Teflon Tough-Coat or Zonyl ™ 5180. Sodium xylene sulfonate increases the water solubility of certain fluorochemicals, causing a disruption of the emulsion surfactant system. Ethoxylated nonylphenol can be substituted for sodium xylene sulfonate.

An example of a suitable blend of polymeric compositions to be used as a stain resistant treatment for polyamides is 65% of the product of Example 2, 15% water, and 20% Zonyl ™ 5180. Between 0.01 and 10% OWG ("OWG" means on the weight of the goods), preferably greater than 1% OWG, of the solution is applied to the polyamide fiber.

Method of Application of Stain Resistant Composition

The stain resistant compositions of the present invention can be applied to dyed or undyed fibers containing polyamide linkages, including synthetic and natural materials such as nylon, wool, silk, and leather. The composition can be applied to a polyamide alone or in combination with a soil and water resistant fluorochemical. The fluorochemical can be applied to the fiber either before or after treatment with the stain resistant composition.

The stain resistant compositions can be applied to fibers and textile articles by any of the methods known to those skilled in the art for application of textile treating solutions. In one method, polyamide is mixed with the polymeric solids in a tumble vat, and then extruded. In another method for application to leather, the composition is applied in a tanning wheel, according to procedures known to those skilled in the art.

Application of 0.01 to 10% of polymeric composition based on the weight of the good to be treated provides effective stain resistance. The amount of composition to be applied will vary based on many factors known to those skilled in the art, including dyeability of the fiber, crystallinity of the polaymide, and type of substrate. The amount is also determined in part by the cost effectiveness of the composition.

The following are nonlimiting examples of the batch exhaust, continuous exhaust, treat and dry (batch or continuous) and foam methods for application of the polymeric compositions.

EXAMPLE 8

Application of the Stain Resistant Product by Batch Exhaust

The stain resistant polymeric composition (0.3% solids based on the weight of the polyamide material), is added to a bath before, during, or after dyeing of polyamide material. The pH is then adjusted to between 0.05 and 4.0, preferably 2.0-2.5, with an acid such as sulfamic, acetic, sulfuric, hydrochloric, formic, or citric acid. The material is allowed to remain in the bath for a time and at a temperature sufficient to exhaust, or deposit, all of the composition onto the polyamide article. The lower the temperature or the higher the pH, the more time is required for exhaustion. The final pH should not exceed 5.5. For example, at a pH of 2.0, a typical exhaustion will take approximately 15 minutes at 160° F. The polyamide material is then cold rinsed and dried.

EXAMPLE 9

Application of the Stain Resistant Product by Continuous Exhaust

An aqueous solution consisting of the stain resistant composition (0.3% solids based on the weight of the polyamide material), adjusted to a pH of 2.0-2.5 with a suitable acid, is applied to the polyamide via a flood, spray, foam, pad, kiss, or print procedure. Heat improves the efficiency of application by swelling the fiber, allowing the polymeric material to penetrate to the inner core. It is preferable to apply the solution at a preheated temperature of between 110° F. and 190° F. If a fluorochemical is used, the preheating temperature should not exceed 120° F. The application can be made before, during, or after dyeing of the polyamide material.

The polyamide material is steam treated after application of the pre-heated or cold material for a time sufficient to "fix" the stain resistant composition onto the polyamide material. For example, a 300% wet pick-up of a 1% solids solution at pH 2.0 is fixed by steaming the polyamide material for 1-2 minutes. The material is then cold rinsed and dried.

EXAMPLE 10

Application of the Stain Resistant Product by Treat and Dry (Batch or Continuous)

A solution of 0.3% solids of the stain resistant composition, based on the weight of polyamide material, adjusted to pH 2.0-5.5 with a suitable acid, is applied by a flood, spray, foam, pad, kiss, or print procedure. The polyamide material is then dried with thermal, steam or electrical heat generation equipment to remove the moisture. The material can also be air dried without heat generation equipment.

EXAMPLE 11

Application of the Stain Resistant Product by Foam Application.

The stain resistant composition can be applied as a foam by mixing a suitable amount of a foam generating surfactant, such as ammonium laurel sulfate, with a solution of between 1:1 and 1:10 of stain resistant composition to water. The foam is applied to the polyamide and then heat cured with steam or thermal set equipment. Alternatively, the material can be air dried.

EXAMPLE 12

Application of the Stain Resistant Product by Continuous Application

Laboratory simulation of continuous application of the stain resistant material was conducted as follows.

To simulate the continuous dyeing of carpet, a 30 gram swatch of an unbacked nylon carpet was placed in a microwave dish containing 120 mL of a solution containing 2.0 grams/liter of dioctyl sulfosuccinate (anionic surfactant) and 1.0 grams/liter of an anionic acid dye leveler. The dish was covered with a perforated lid and steamed in a microwave for 3 minutes to remove any tint or dirt. The steamed swatch was then rinsed in cold water.

The mock dyed swatch was then placed in a microwave dish containing 120 mL of a 10 gram/liter solution of the stain resistant composition buffered to a pH of 1.5-3.0 with sulfamic acid, preferably a pH of 2.0. The dish was covered and placed in the microwave for 3 minutes. The swatch was then removed from the heated bath and rinsed in cold water. Good results were observed when the carpet was dried after treatment with the composition.

In another variation of these methods for applying the stain resistant composition, the coated substrate is heated after the stain resistant composition has been applied to the substrate for an amount of time sufficient to crosslink the composition.

EXAMPLE 13

Application of the Stain Resistant Product by Continuous and Batch Process Using A Divalent Metal Salts The inclusion of a small amount of a divalent metal salt (less than 0.05% OWG), such as a salt of magnesium, results in an improvement in stain resistance of the polyamide substrate prior to and after alkaline shampoo treatment.

In variations of the method for applying the stain resistant composition to fibers containing polyamide linkages, the stain resistant composition is applied in a detergent solution containing nonionic or anionic surfactants, or along with anionic antistatic agents or other water soluble polymers.

The composition can also be used as a flexible polymeric novolac type surface coating, construction insulation material, or electrical insulation product. It can also be used as a base in glue, paints, and molding resins using procedures similar to those known to those skilled in the art for incorporating other novolac type polymers.

EXAMPLE 14

Use of Heat to Increase Performance of the Stain Resistant Composition

The performance of the stain resistant formulations described herein can be enhanced by heat treatment which in general improves the adhesion of the composition to the fiber. Sussen heat treatment after application of the composition is preferred. Constant temperatures above 300° C. can cause crosslinking.

Optimal adhesion of the composition is achieved when the composition has terminal groups that can covalently react with the nylon fiber on application of heat. Formaldehyde condensation polymers that are prepared under alkaline conditions, such as Nylofixan P manufactured by Sandoz Chemical Corporation, are especially suitable, because they contain additional functional groups, such as hydroxyl groups, available for covalent bonding.

EXAMPLE 15

Demonstration of Stain Resistance and Discoloration.

The stain resistant compositions are effective in protecting nylon, wool, silk, natural leather and synthetic leather from stains resulting from exposure to acid dyes such as those contained in soft drinks and mustard.

A particularly difficult acid dye to remove, Food, Drug, and Cosmetic Red Dye No. 40 (Red Dye No. 40; also referred to as CIFR 17), is found in certain soft drinks. When Red Dye No. 40 is spilled on nylon carpet, the sulfonate groups in the dye attach to protonated amines in the nylon, forming an ionic or Van der Waals bond that holds the dye, staining the carpet.

As a polyamide fiber is stained or yellows, its color increases. The "delta E value" of the fiber is a measure of the difference in intensity of color of the nylon fiber before and after acid dye or light treatment. Therefore, the higher the delta E value, the more color retained by the fiber, and the lower ability of the fiber to resist staining, or the greater the tendency of the composition to discolor as a function of exposure to light.

Polyamide fibers treated with the polymeric compositions were tested for their ability to resist staining and discoloration.

To test the tendency of treated polyamide fibers to discolor on exposure to acid dyes, samples of treated polyamide fibers were subjected to 24 hours of "Kool-Aid" food drink containing Red Food Dye No. 40. The samples were then analyzed with a spectrophotometer and compared to an untreated, similarly stained polyamide surface. The difference in intensity of color absorption by the sample and the control was measured. A similar test was performed to measure the tendency of treated polyamide fibers to discolor in the presence of coffee.

To measure the tendency of treated polyamide fibers to discolor on exposure to light, samples of polyamide fibers treated with the stain resistant composition were exposed to 20 and 40 hours of continuous xenon light exposure. The sample color was then analyzed with a spectrophotometer and compared with a stain resistant polyamide fiber that had not been exposed to xenon light. The difference in color value contributed by the oxidation-yellowing effect was measured.

Figure 3:
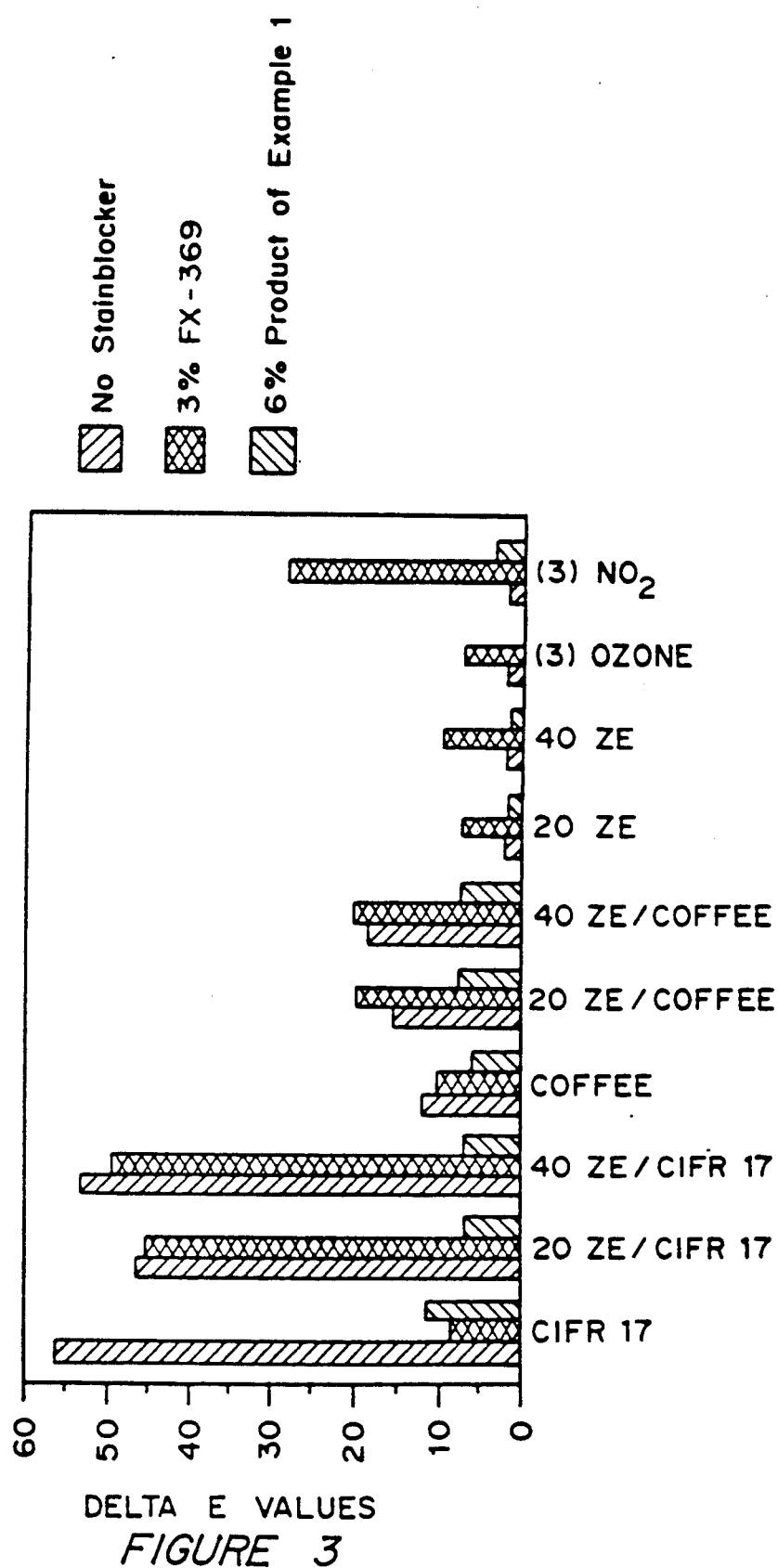
FIG. 3 is a bar chart graph that illustrates the stain resisting properties of 3871 superba yarn treated with FX-369 (condensation polymer of 4,4'-dihydorxydiphenylsulfone) and, the product of Example 1.

FIG. 3 is a bar chart graph that illustrates the stain resisting properties (the delta E values) of Merge 3871 superba set type 6 nylon yarn treated with FX-369 (Minnesota Mining and Manufacturing Company; a sulfonated 4,4'-dihydroxydiphenylsulfone formaldehyde condensation polymer).

As seen in FIG. 3, polyamide fiber treated with a 6% solution of the product of Example 1 exhibits less discoloration than untreated fiber or FX-369 treated fiber when exposed to red food dye No. 40 and xenon light, coffee, xenon light alone and ozone. Further, a 3% solution application of the product of Example 3 has approximately the same stain resisting properties as a 6% solution of the product of Example 1.

The stain resistant compositions provide superior protection from mustard with tumeric and coffee, which have historically been more difficult to resist than Red Dye No. 40. For example, a composition prepared as described in Example 1 inhibits staining from mustard with tumeric or coffee when applied at 160° F. (71° C.) to a 3 inch diameter circle for 30 minutes and then rinsed with cold water. Compositions prepared as in Example 2 also inhibit staining from mustard with tumeric or coffee.

EXAMPLE 16

Demonstration of Resistance to Discoloration Alone

The stain resistant compositions represent a significant advance in stain resistant technology since they do not discolor significantly over an extended period of time, as demonstrated by the following experiment.

Carpet samples were treated with an equal solids amount at pH 2.0 of NRD 332 (Du Pont Stainmaster, Anzo 5 MAK 7 (Allied Chemical Corp.), CB-130 (Grifftex Corp.), FX-369 (Minnesota Mining & Mfg. Co.), and the stain resistant composition as prepared in Example 1. All of the carpet samples were exposed to 20 standard fade units of xenon light, and then graded in accordance to the AATCC gray scale for light fastness breaks. The scale, which ranges from 1-5, is a measure of the degree of discoloration, with 5 indicative of no discoloration or color break.

The results demonstrate the superiority of the stain resistant compositions of the present invention.

| Composition | Degree of Discoloration |
| --- | --- |
| Product of Example 1, 2 and 3 | 5 |
| Du Pont ND 332 | 3 |
| Allied Anzo 5 MAK 7 | 3-4 |
| Grifftex CB-130 | 3-4 |
| 3M FX-369 | 3-4 |

Modifications and variations of the present invention, a method and compositions for increasing stain resistance of fibers having polyamide linkages, will be obvious to those skilled in the art from the foregoing detailed description. Such modifications and variations are intended to come within the scope of the appended claims.

We claim:

1. A stain resistant composition comprising a polymeric product prepared by:
    polymerizing $H_2C=C(R)CO_2X$,
    where R is a hydrocarbon, halogenated hydrocarbon, or sulfonated hydrocarbon of from $C_1$ to $C_{20}$, phenol, naphthol, sulfonated phenol, sulfonated naphthol or a halogen, X is H or a hydroxylated, ethoxylated, sulfonated, or halogenated hydrocarbon of $C_1$ to $C_{20}$, and wherein R and X can vary within the polymer,
    in the presence of a sulfonated aromatic formaldehyde condensation polymer,
    in a ratio of up to seven parts $H_2C=C(R)CO_2X$ to one part by weight condensation polymer.

2. The composition of claim 1 wherein the polymerization of $H_2C=C(R)CO_2X$ is carried out in a solution with an active solids content of greater than 15%.

3. The composition of claim 2 wherein the ratio of grams of $H_2C=C(R)CO_2X$ to grams of condensation polymer in the polymerization mixture is between approximately 6:1 and 2:1.

4. The composition of claim 1 wherein R is selected from the group consisting of methyl, ethyl, propyl, butyl, phenyl phenol, sulfonated phenol, naphthol, chloro, and fluoro.

5. The composition of claim 1 wherein X is hydrogen.

6. The composition of claim 1 wherein X is a sulfonated hydroxyaromatic compound.

7. The composition of claim 6 wherein X is selected from the group consisting of sulfonated dihydroxydiphenylsulfone, hydroxybenzenesulfonic acid, hydroxynaphthalenesulfonic acid, and 2,4-dimethylbenzenesulfonic acid.

8. The composition of claim 1 wherein X is a fluorinated or perfluorinated alkyl group.

9. The composition of claim 1 wherein $H_2C=C(R)CO_2X$ is copolymerized with a fluorinated α-substituted acrylic acid or acrylate.

10. The composition of claim 9 wherein the fluorinated α-substituted acrylic acid is a $C_8$ to $C_{12}$ fluorinated ester.

11. The composition of claim 1 wherein the aromatic group in the sulfonated aromatic condensation polymer is selected from the group consisting of phenyl, phenol, naphthol, naphthalene, and 4,4'-dihydroxydiphenylsulfone.

12. The composition of claim 1 further comprising a compound selected from the group consisting of anionic surfactants, nonionic surfactants, foaming surfactants and anionic antistatic agents.

13. The composition of claim 1 wherein the surfactant is ammonium laurel sulfate.

14. The composition of claim 1 containing less than 1% monomer.

15. A method of preparing a stain resistant composition comprising:
    polymerizing $H_2C=C(R)CO_2X$,
    where R is a hydrocarbon, halogenated hydrocarbon, or sulfonated hydrocarbon of from $C_1$ to $C_{20}$, phenol, naphthol, sulfonated phenol, sulfonated naphthol or a halogen, X is H or a hydroxylated, ethoxylated, sulfonated, or halogenated hydrocarbon of $C_1$ to $C_{20}$, and wherein R and X can vary within the polymer,
    in the presence of 1 part of a sulfonated aromatic formaldehyde condensation polymer;
    in a ratio of up to seven parts $H_2C=C(R)CO_2X$ to one part by weight condensation polymer.

16. The method of claim 15 further comprising initiating the polymerization with a free radical producing agent.

17. The method of claim 15 wherein the free radical producing agent is selected from the group consisting of potassium persulfate, ammonium persulfate, and sodium persulfate.

18. The method of claim 15 further comprising polymerizing the $H_2C=C(R)CO_2X$ at a temperature of between 50° C. and 100° C.

19. The method of claim 15 further comprising polymerizing the $H_2C=C(R)CO_2X$ until less than 1% monomer remains.

20. The method of claim 15 wherein X is H, further comprising providing a ratio of grams of $H_2C=C(R)CO_2X$ to grams of condensation polymer solids in the polymerization mixture of between approximately 6:1 and 2:1.

21. The method of claim 15 wherein $H_2C=C(R)CO_2X$ is polymerized in a solution with greater than 15% solids content.

22. The method of claim 15 further comprising adding a viscosity adjusting reagent to the reaction mixture before polymerization.

23. The method of claim 15 further comprising selecting R from the group consisting of methyl, ethyl, propyl, butyl, phenyl, phenol, naphthol, sulfonated naphthol, sulfonated phenol, fluoro, and chloro.

24. The method of claim 15, further comprising selecting X as H.

25. The method of claim 15 further comprising polymerizing $H_2C=C(R)CO_2X$ by a dose feed process.

26. The method of claim 15, further comprising adding xylene sulfonic acid or toluene sulfonic acid to the polymerization reaction.

27. The composition of claim 1, wherein a viscosity reducing agent is added to the polymerization reaction.

28. The composition of claim 27, wherein the viscosity reducing agent comprises a sodium, potassium, or ammonium salt of xylene sulfonate, cumene sulfonate, toluene sulfonate, or dodecyldiphenyl disulfonate.

29. The composition of claim 1, wherein a compound selected from the group consisting of toluene sulfonic acid and xylene sulfonic acid is added to the reaction mixture.

30. The composition of claim 1, wherein the sulfonated aromatic formaldehyde condensation polymer is a formaldehyde condensation copolymer of 4,4'-solfonylbisphenol with a compound selected from the group consisting of naphthalene sulfonic acid and xylene sulfonic acid or their salts.

31. The method of claim 22, wherein the viscosity adjusting reagent comprises a sodium, potassium, or ammonium salt of a compound selected from the group consisting of xylene sulfonate, cumene sulfonate, toluene sulfonate, or dodecyldiphenyl disulfonate.

32. The method of claim 15, wherein the sulfonated aromatic formaldehyde condensation polymer is a formaldehyde condensation copolymer of 4,4'-sulfonylbisphenol with a compound selected form the group consisting of naphthalene sulfonic acid and xylene sulfonic acid or their salts.

* * * * *